UNITED STATES PATENT OFFICE.

CARL SORGER, OF FRANKFORT-ON-THE-MAIN, GERMANY.

MANUFACTURE OF SALICYLIC ACID GLYCERIN ESTERS.

No. 882,590.  Specification of Letters Patent.  Patented March 24, 1908.

Application filed January 14, 1907. Serial No. 352,261. (Specimens.)

*To all whom it may concern:*

Be it known that I, CARL SORGER, a subject of the German Emperor, and a resident of Frankfort-on-the-Main, Germany, have invented certain new and useful Improvements in the Manufacture of Salicylic Acid Glycerin Esters, of which the following is a specification.

My invention relates to improvements in the manufacture of salicylic acid glycerin esters and to the new product produced thereby, which process broadly consists in heating alphyl esters of salicylic acid with glycerin, and in certain details set forth hereafter. By said new process a product of valuable therapeutic properties is produced which can be used as an antirheumatic and an antiseptic particularly for external use. The product answers the following formula:

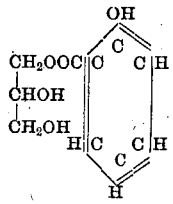

The substitution of one alcohol radical by another one in esters for producing new esters has heretofore received but little attention, and such substitution as has been proposed related merely to esters the acids of which belong to the fat series. It has been found, that alcohols of higher valence and polyatomic univalent alcohols in esters can be replaced by alcohols of lower atomicity. This substitution however is not universally applicable. For example the process of producing formic acid methyl ester by heating formic acid brenzracemic ester with methyl alcohol described by L. Henry (*Bulletin Acad. Roy. Belgique* 1902, p. 445 and *Centralblatt* 1902 II p. 928) fails when applied to heating acetic acid brenzracemic ester with methyl alcohol. Furthermore, in the German Patent No. 99,057 (Example 2), a process has been described which consists in replacing, in a carbonic acid ester having one alcohol radical and one phenol radical, the said alcohol radical by the corresponding phenol radical by means of the action of one phenol. However, the substitution of one aliphatic alcohol radical by another one in esters of aromatic acids has not yet become known. Now, I have found, that by heating the salicylic acid ethyl ester with glycerin a salicylic acid glycerin ester of high therapeutical properties is obtained. The reaction takes place in such a way that the alcohol of low atomicity is separated from the ester by distillation and is replaced by an alcohol of higher valency and higher atomicity, viz. the glycerin. The process is therefore inverse to that of the esters of the fat series referred to above.

The exchange of the alcohol in my new process of producing glycerin ester is effected in the same manner, as for example in the case of the easily separable acid esters of the phenols, as has been found with the salicylic acid phenyl ester, or salol (see German Patent No. 111,656). However, the reaction referred to in the said patent can also not universally be carried out as indicated in said patent; therefore further investigations were necessary in each case.

My new process involves an improvement in the process of producing salicylic acid glycerin esters described in the German Patents Nos. 126,311 and 127,139, because the raw material used is cheaper, the higher price of the alphyl esters of salicylic acid used in my process instead of the salicylic acid used in the process referred to being more than compensated by the expense for the much greater quantity of glycerin required in the processes known heretofore. And on the other hand it is not necessary in my process to isolate the product of the reaction. The result of the reaction, viz. the production of salicylic acid glycerin ester could not be anticipated because the glycerin, as is well known, is decomposed at higher temperatures (formation of acrolein), and the same is the case with salicylic acid when heated above its melting point. The substitution of the methyl alcohol in my process when heated with glycerin is effected more speedily than that of ethyl alcohol. The reaction is promoted by using a small amount of hydrate of sodium or of sodium salts, such as the carbonate, acetate, salicylate, on account of the catalytical action of these substances. An excess of the sodium compound, however, causes saponifying. By the addition of sodium compounds the formation of by-products is almost entirely avoided.

In the following, I give two examples of my new process from which the invention will be clearly understood, the parts being given by weights:

First example: 100 parts of salicylic acid methyl ester and 120 parts of glycerin together with 0.2 parts of acetate of sodium are heated gradually up to 195° centigrade, when a milk-like liquid is distilled off which consists of water and a small quantity of ester. When the said temperature has been reached the liquids which before were separated, commence gradually to combine in a homogeneous liquid, and the alcohol commences to distil off (also carrying with itself a small quantity of methyl ester). The methyl alcohol in the distillate may after rectification be used again for the manufacture of salicylic acid methyl ester. When the distillation of the alcohol begins, the temperature is gradually raised within 24 hours to 215° centigrade until no more alcohol distils off. The oily product of reaction is poured into hot water in order to isolate the glycerin ester. After the solution has remained in an unheated condition for a while the ester separates almost wholly in crystalline form, but it may also be separated from the watery solution by means of ether. When crystallized again from the ether it forms fine white needles the properties of which are the same as those of the known monosalicylic acid-glycerin ester.

Second example: 100 parts of salicylic acid ethyl ester and 120 parts of glycerin are treated in the same way as in Example I whereby the ethyl-alcohol is distilled off. The further steps of the process are the same as in the preceding example.

The process described in the examples is illustrated by the following equation:

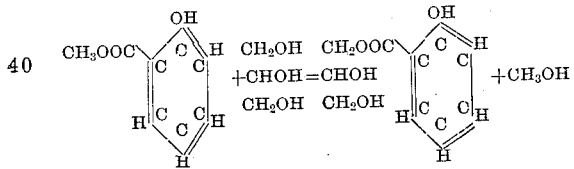

The product of the reaction, viz., the monosalicylic-acid glycerin ester, the formula of which is stated above, crystallizes into white needles the melting point of which is between 74 and 76° centigrade. Cold water dissolves but small proportions thereof, viz., only 1 per cent., while hot water dissolves it easily. The same applies to benzol and petroleum ether. It is easily soluble in glycerin and alcohol, a little less in ether. It is easily separated into its components by alkalies and carbonates of alkalies. The crystals are inodorous and have a bitter taste. The product is used as an antirheumatic and an antiseptic especially for external use, as its oily solution into glycerin and alcohol is easily absorbed by the skin.

I claim:

1. The herein described process of producing a salicylic acid glycerin ester, which consists in heating a mixture of an alphyl ester of salicylic acid and glycerin to a temperature at which the alcohol set free is distilled off, and isolating the glycerin ester from the oily product of reaction by the addition of a non-solvent.

2. The herein described process of producing a salicylic acid glycerin ester, which consists in heating a mixture of an alphyl ester of salicylic acid and glycerin to a temperture at which the alcohol set free is distilled off, and isolating the glycerin ester from the oily product of reaction by the addition of cold water.

3. The herein described process of producing a salicylic acid glycerin ester, which consists in heating a mixture of an alphyl ester of salicylic acid and glycerin to a temperture at which the alcohol set free is distilled off, isolating the glycerin ester from the oily product of reaction by means of cold water and separating the same from its solution in water by the addition of ether.

4. The herein described process of producing a salicylic acid glycerin ester, which consists in heating a mixture of an alphyl ester of salicylic acid, glycerin and a sodium compound to a temperature at which the alcohol set free is distilled off, and isolating the glycerin ester from the oily product of reaction by the addition of a non-solvent.

In testimony whereof I have signed my name to this specification in the presence of two subscribing witnesses.

CARL SORGER.

Witnesses:
 FRANZ HASSLACHER,
 MICHAEL VOLK.